UNITED STATES PATENT OFFICE.

JACOB OSWALD AND WILLIAM H. DOERING, OF PHILADELPHIA, PENNSYLVANIA, ASSIGNORS TO JOSEPH FELS AND SAMUEL S. FELS, COPARTNERS DOING BUSINESS UNDER THE NAME OF FELS & COMPANY, OF PHILADELPHIA, PENNSYLVANIA.

CATALYTIC AGENT AND PROCESS OF MAKING SAME.

1,187,775.     Specification of Letters Patent.     Patented June 20, 1916.

No Drawing.     Application filed June 10, 1910. Serial No. 566,162.

*To all whom it may concern:*

Be it known that we, JACOB OSWALD and WILLIAM H. DOERING, citizens of the United States, and residents of Philadelphia, in the county of Philadelphia and State of Pennsylvania, have invented certain new and useful Improvements in Catalytic Agents and Processes of Making Same, for Use in the Treatment of Oils, Fats, and the like, of which the following is a specification.

The process of saturating unsaturated compounds by the action of hydrogen in the presence of a finely distributed catalyzing metal such as nickel, cobalt, iron, copper, etc., is well known and described by Sabatier and Senderens (*Annales de Chimie et de Physique*, 1905). Sabatier and Senderens prepared their catalytic metals by reducing oxids of nickel, cobalt, etc., with hydrogen at as low a temperature as possible, producing reduced metal as a fine powder. As metal in this condition is sensitive to the action of air and often takes fire on exposure thereto (is pyrophoric), their material was allowed to cool in hydrogen and was carefully protected from access of air. Freshly made catalytic metal of this nature is capable of inducing a combination of hydrogen with oils and other unsaturated materials. The changes thus wrought in fats, oils and the like are of practical value chiefly because they improve and render available additional supplies of materials used in the arts. It is accordingly important that the process be rendered available under a variety of practical commercial conditions. One of the difficulties heretofore encountered has been connected with the application and use of the catalytic agent and it is a purpose of our invention to eliminate this difficulty by providing a proper agent in safe, stable and convenient form.

The manner in which the finely distributed catalyzing metal may be obtained is known and the invention which we seek to protect hereby does not necessitate any change therein. The agent heretofore known prepared according to known methods, consisting of a finely divided or finely distributed metal with inert material on which it is spread, possesses two characteristics which so far impair its usefulness as to render it commercially of limited value, to wit:—It quickly loses its activity and becomes wholly inert when exposed to air, and it is highly pyrophoric and unsafe.

The purpose of our invention is to render it safe, stable and commercially available and thus provide a catalytic agent for use in the saturation of unsaturated compounds of great practical value.

When the agent or finely distributed metal has been prepared according to known methods and processes it is in a vessel under hydrogen and in a so highly reactive, sensitive condition that its usefulness will be destroyed by contact with the air. Our present invention begins at this point and may be practised in several ways. For example, we put into the vessel containing the finely distributed, freshly reduced, highly catalytic metal, without allowing admission of air, a quantity of fat, which is preferably a fat which has been converted by the process above referred to from an oily unsaturated to a saturated compound, accomplishing this conveniently by running it in in melted condition, if it is solid at ordinary temperature, then permitting the whole, while being agitated, to cool to a point just above its melting point, when the whole mass which is still fluent is poured into any convenient receptacle for use, storage or shipment. In this the mass may solidify. Or the finely distributed freshly reduced unused metal is introduced into a vessel containing such fat in a liquid state and under an atmosphere of hydrogen and the whole permitted, while being agitated, to cool. The fat with which the finely distributed active metal is incorporated acts as a protective and shielding agent. It is inert as regards the metal having no deleterious action on its chemical reactivity. The quantity of fat used may vary within considerable limits, equal parts of the agent and fat making a satisfactory article. The proportion of fat should be at least sufficient to cover and shield the metal surfaces. With about equal amounts of readily solidifying fat and catalytic agent, this result is obtained and an article of desirable consistency, readily handled, cut and subdivided is obtained; an article which may be handled with convenience. It carries a substantial amount of catalyst; an amount sufficient for the treatment of many times the amount of oil or fat it contains. On placing it in hot oil, the fat melts and dissolves; and if it be of the same nature as the fat to be produced from such oil, its presence does not change in any way the nature of the final product. In any event, the amount which is used with the agent is, relative to the amount of oil which can be treated with a given amount of agent, wholly insignificant. The present article carries a substantial amount of metal; an amount sufficient to treat many times the amount of oleaginous material present in it. The fat serves as a vehicle and shield for the particles of finely distributed metal and the two together make an article entirely safe and stable, which may be safely and conveniently used, stored and shipped and is of such a nature that it contains nothing materially inhibiting the catalytic action or use of the finely distributed metal in converting oils, fats and the like. Being freshly reduced and the fat exercising no action on it other than a protective action in shielding it from access of air, etc., it will retain indefinitely its high catalytic power; the catalytic power of freshly prepared reduced metal. It represents, we believe, the first commercially available catalytic agent of indefinite keeping power for the saturation of unsaturated compounds.

What we claim and desire to secure by Letters Patent is:—

1. A solid catalytic agent for use in the treatment of oils, fats and the like, comprising a mixture of a finely distributed, reactive, air-sensitive, catalyzing metal having the high catalyzing power of freshly reduced unused metal, and a vehicle of a fatty nature.

2. A solid catalytic agent for use in the treatment of oils, fats and the like, comprising a mixture of a finely distributed, reactive, air-sensitive catalyzing metal having the high catalyzing power of freshly reduced unused metal, having its surfaces protected and shielded by a covering of material of a fatty nature.

3. A solid catalytic agent for use in the treatment of oils, fats and the like, comprising a mixture of a finely distributed, air-sensitive catalyzing metal having the high catalyzing power of freshly reduced unused metal incorporated in a mass of material of a fatty nature.

4. A solid catalytic agent for use in the treatment of oils, fats and the like, comprising a mixture of a finely distributed, air-sensitive catalyzing metal having the high catalyzing power of freshly reduced unused metal, and a vehicle of a fatty nature and having the properties of an unsaturated compound which has been saturated.

5. A process of preparing a finely distributed, metal catalyzer for convenient shipment, storage or use, which comprises preparing a finely distributed, catalyzing metal in the presence of hydrogen and incorporating with such metal a protective agent of a fatty nature in amount merely sufficient to cover and protect the metal surfaces.

6. As a new article of manufacture, a solid fatty body carrying in admixture and incorporated therewith finely distributed air-sensitive catalytic metal in substantial proportions, the amount of such metal being sufficient for the treatment of much more oil or fat than is contained in said body and such metal having the highly reactive properties of freshly reduced metal.

7. As a new article of manufacture, a protected catalyst comprising an air-sensitive catalytic metal, said metal having the highly reactive properties of freshly reduced unused metal, and enough oleaginous material to cover and shield the metal, said metal being present in much larger proportion than is required for the catalytic treatment of the amount of oleaginous matter present.

8. A process of preparing a catalytic agent for the treatment of oils, fats and the like, which comprises preparing a finely distributed, reactive, catalyzing metal in the presence of hydrogen and without allowing said metal to come in contact with air incorporating a small amount of a protective and shielding agent of a fatty nature with such metal.

9. A process of preparing a catalytic agent for the treatment of oils, fats and the like, comprising preparing a finely distributed, catalyzing metal in the presence of hydrogen, incorporating with such metal a molten protective and shielding agent of a fatty nature and allowing the admixture to cool to solidify such agent.

10. A process of preparing a catalytic agent comprising reducing material comprising a catalytic metal by a suitable reducing agent in finely divided form, and at once incorporating therewith a sufficient amount of a fatty body to cover and shield the sensitive metal surfaces.

11. A process of preparing a catalytic agent comprising reducing material comprising a catalytic metal by a suitable reducing agent, adding to the reduced material sufficient molten fat to cover and shield the sensitive metal surfaces and allowing the mixture to cool to solidify such fat.

Signed at Philadelphia, Pennsylvania, this eighth day of June, 1910.

JACOB OSWALD.
WILLIAM H. DOERING.

Witnesses:
HARRY W. SUBERS,
CHARLES GUNDEL.